(12) United States Patent
Miyazaki

(10) Patent No.: US 11,301,179 B2
(45) Date of Patent: Apr. 12, 2022

(54) IMAGE FORMING APPARATUS AND CONTROL PROGRAM OF IMAGE FORMING APPARATUS

(71) Applicant: KONICA MINOLTA, INC., Tokyo (JP)

(72) Inventor: Ken Miyazaki, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/922,136

(22) Filed: Jul. 7, 2020

(65) Prior Publication Data

US 2021/0055892 A1    Feb. 25, 2021

(30) Foreign Application Priority Data

Aug. 20, 2019   (JP) .............................. JP2019-150423

(51) Int. Cl.
  *G06F 3/12*     (2006.01)
  *G03G 15/00*    (2006.01)

(52) U.S. Cl.
  CPC ....... *G06F 3/1208* (2013.01); *G03G 15/5016* (2013.01); *G06F 3/1252* (2013.01); *G06F 3/1255* (2013.01)

(58) Field of Classification Search
  CPC .... G06F 3/1208; G06F 3/1252; G06F 3/1255; G06F 3/1253; G06F 3/1203; G06F 3/1264; G03G 15/5016
  See application file for complete search history.

(56) References Cited

U.S. PATENT DOCUMENTS

| 2015/0178602 | A1* | 6/2015 | Kusakabe | .......... G06K 15/1805 358/1.15 |
| 2017/0336744 | A1* | 11/2017 | Noda | ..................... G03G 15/50 |
| 2018/0260171 | A1* | 9/2018 | Inoda | .................... G06F 3/1282 |

FOREIGN PATENT DOCUMENTS

JP            2018069659 A       5/2018

\* cited by examiner

*Primary Examiner* — Iriana Cruz
(74) *Attorney, Agent, or Firm* — Holtz, Holtz & Volek PC

(57) ABSTRACT

There is provided an image forming apparatus that forms an image to which foil is to be transferred in foil stamping printing, the image forming apparatus including a hardware processor that outputs a calculation result of a total length in a sheet conveyance direction of an image part/image parts formed at time of execution of a print job.

12 Claims, 6 Drawing Sheets

FIG. 7

SELECT JOB FROM LIST TO EXECUTE JOB OPERATION

NUMBER OF JOBS TEMPORARILY SAVED 015

| | FILE NAME | RESERVED JOB FOR OUTPUT | USER NAME | DATE AND TIME OF UPDATE ▼ | NO. OF PAGES | NO. OF COPIES | |
|---|---|---|---|---|---|---|---|
| ☐ | JOB1 | | 0015 | 03/06 10:50 | 1 | 1 | SELECT MULTIPLE |
| ☐ | JOB2 | | 0014 | 03/06 10:52 | 1 | 1 | SELECT ALL |
| ☐ | JOB3 | | 0013 | 03/06 10:54 | 1 | 1 | |
| ☐ | JOB4 | | 0012 | 03/06 10:56 | 1 | 1 | DELETE |
| ☐ | JOB5 | | 0011 | 03/06 10:58 | 1 | 1 | DUPLICATE |
| ☐ | JOB6 | | 0010 | 03/06 11:00 | 1 | 1 | |
| ☐ | JOB7 | | 0009 | 03/06 11:02 | 1 | 1 | SAVE IN HDD |
| ☐ | JOB8 | | 0008 | 03/06 11:04 | 1 | 1 | |
| ☐ | JOB9 | | 0007 | 03/06 11:06 | 1 | 1 | |
| ☐ | JOB10 | | 0006 | 03/06 11:08 | 1 | 1 | EDIT JOB |
| ☐ | JOB11 | | 0005 | 03/06 11:10 | 1 | 1 | JOB TICKET |
| ☐ | JOB12 | | 0004 | 03/06 11:12 | 1 | 1 | EDIT PAGE |
| ☐ | JOB13 | | 0003 | 03/06 11:14 | 1 | 1 | |
| ☐ | JOB14 | | 0002 | 03/06 11:16 | 1 | 1 | JOIN |
| ☐ | JOB15 | | 0001 | 03/06 11:18 | 1 | 1 | |

JOB CURRENTLY SELECTED

Happy Birthday

- TRAY : AUTO
- SIZE : A4
- TYPE : N/S
- BASIS WEIGHT : N/S
- PRINT SIDE : SINGLE
- COLOR : FULL COLOR
- OUTPUT SETTING : ----
- EJECTION TRAY : AUTO

TOTAL PRINT LENGTH: 100m

☐ DELETE JOB WHEN OUTPUT   ☐ DIRECT OUTPUT   OUTPUT

APPARATUS STATE | JOB LIST | READ | SAVE | COPY | SCAN

DOCUMENT COUNTER 0 | MEMORY AVAILABILITY 99.999%
NO. OF RESERVED JOBS 0 | FILE SYSTEM AVAILABILITY 99.367%

JOB TEMPORARILY SAVED | CONFIDENTIAL JOB | SCHEDULE | DEVELOPMENT STATUS | OUTPUT HISTORY | TRANSMISSION HISTORY | PENDING OUTPUT HISTORY

16:39 PRINT DATA CAN BE RECEIVED   DRU-M   FIXING A

IMAGE FORMING APPARATUS AND CONTROL PROGRAM OF IMAGE FORMING APPARATUS

The entire disclosure of Japanese patent Application No. 2019-150423, filed on Aug. 20, 2019, is incorporated herein by reference in its entirety.

BACKGROUND

Technological Field

The present invention relates to an image forming apparatus and a control program of an image forming apparatus.

Description of the Related Art

There is known a technology of foil stamping printing in which a sheet on which a toner image is formed is overlapped with foil and applied with heating and pressing to transfer the foil to the toner image. Since the foil used for the foil stamping printing is extremely expensive, a technology that suppresses wasteful consumption of the foil is required. For example, when the foil is used up on the way of foil transfer to sheets, a sheet to which the foil has been transferred halfway turns out to be a waste sheet, and the foil that has been transferred to the sheet halfway is wasted. Therefore, a technology that suppresses such a situation is required. Accordingly, JP 2018-69659 A discloses, for example, a technology in which a required use amount of foil is calculated beforehand on the basis of a print job.

However, according to a technology disclosed in JP 2018-69659 A, a use amount of foil corresponding a length of a sheet/sheets conveyed at the time of executing a print job is calculated. However, among foil stamping apparatuses used in foil stamping printing, there is a foil stamping apparatus that has functions of: detecting an image part/image parts formed on the sheet/sheets; and conveying the foil in accordance with the image part/image parts. In a case of using such a foil stamping apparatus, a use amount of the foil does not correspond to a conveyance amount of the sheet/sheets, and an operator of the foil stamping printing may not be able to accurately grasp the use amount of the foil although confirming the length of the conveyed sheet/sheets.

SUMMARY

The present invention is made in view of the above-described problem. Therefore, the present invention is directed to providing an image forming apparatus and a control program of the image forming apparatus which are capable of making an operator accurately grasp a use amount of foil in foil stamping printing.

To achieve the abovementioned object, according to an aspect of the present invention, there is provided an image forming apparatus that forms an image to which foil is to be transferred in foil stamping printing, and the image forming apparatus reflecting one aspect of the present invention comprises a hardware processor that outputs a calculation result of a total length in a sheet conveyance direction of an image part/image parts formed at time of execution of a print job.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a diagram illustrating an exemplary screen to output a calculation result of a predetermined length associated with a print job.

DETAILED DESCRIPTION OF EMBODIMENTS

Figure 1:
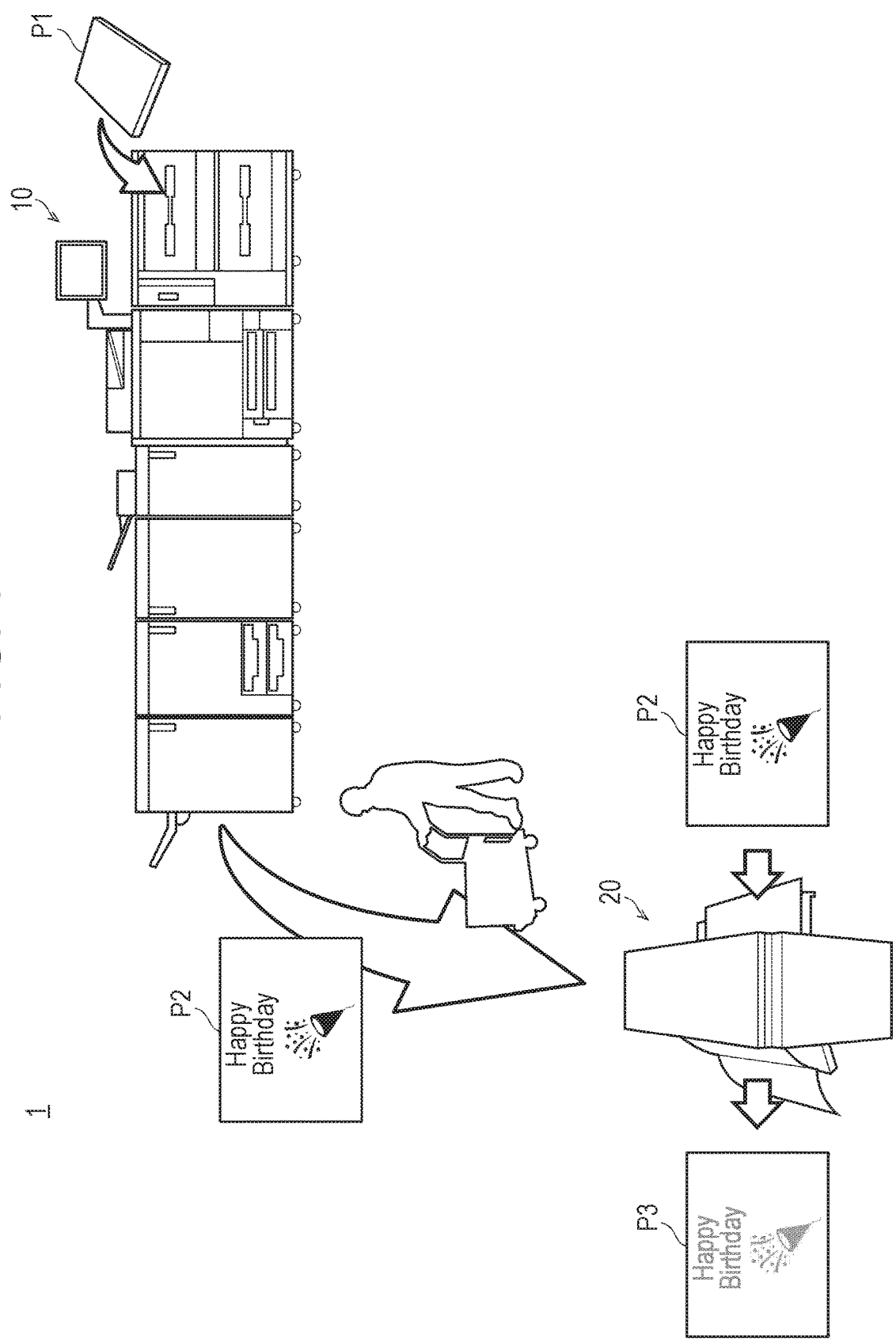
FIG. 1 is a view illustrating a schematic configuration of an image forming system according to an embodiment of the present invention.

Hereinafter, one or more embodiments of the present invention will be described with reference to the drawings. However, the scope of the invention is not limited to the disclosed embodiments. Note that the same elements will be denoted by the same reference signs in the description of the drawings and repetition of the same description will be omitted. Additionally, note that dimensional ratios in the drawings are exaggerated for convenience of description and may differ from actual ratios.

(Image Forming System)

FIG. 1 is a diagram illustrating a schematic configuration of an image forming system according to an embodiment of the present invention.

As illustrated in FIG. 1, the image forming system 1 includes an image forming apparatus 10 and a foil stamping apparatus 20.

The image forming apparatus 10 forms, on a sheet P1, a toner image to which foil is to be transferred in foil stamping printing, and outputs a sheet P2 having the toner image formed thereon. The sheet P2 having the toner image formed thereon is manually carried and set on the foil stamping apparatus 20 by an operator of the foil stamping printing.

In the foil stamping apparatus 20, the sheet P2 having the toner image formed thereon is overlapped with foil wound in a roll shape, for example, and applied with heating and pressing. Then, the foil is transferred to the toner image while using melted toner as an adhesive. Then, the foil stamping apparatus 20 outputs a final printed matter P3 to which the foil has been transferred. The foil stamping apparatus 20 may have functions of: detecting a part of the toner image formed on the sheet P2; and conveying the foil in accordance with a part of the toner image.

(Image Forming Apparatus)

Figure 2:
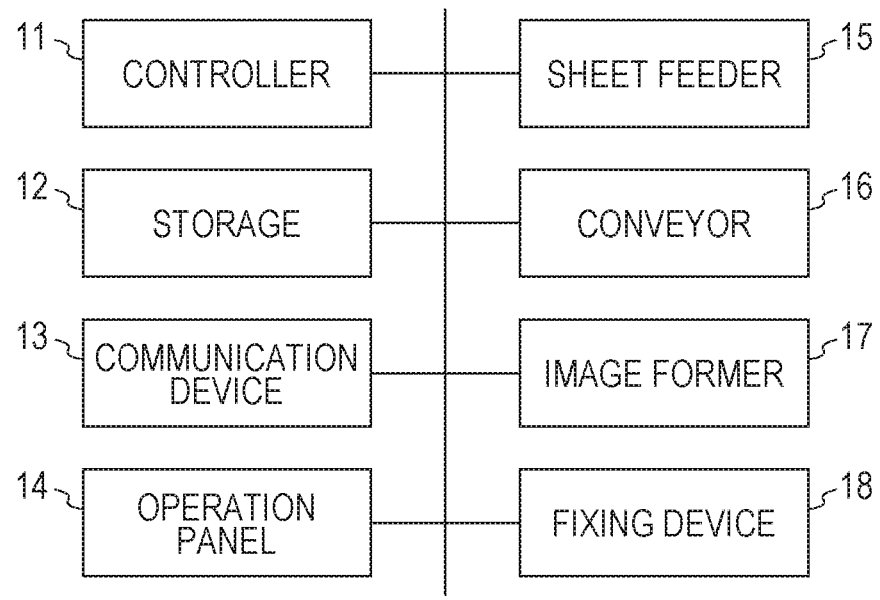
FIG. 2 is a block diagram illustrating a schematic configuration of an image forming apparatus.

Next, details of the image forming apparatus 10 will be described. FIG. 2 is a block diagram illustrating functional configurations of the image forming apparatus.

As illustrated in FIG. 2, the image forming apparatus 10 includes a controller 11, a storage 12, a communication device 13, an operation panel 14, a sheet feeder 15, a conveyor 16, an image former 17, and a fixing device 18. The respective constituent elements are connected to one another via a bus adapted to exchange signals.

The controller 11 includes a central processing unit (CPU) and executes, in accordance with a program: control of the above-mentioned constituent elements; and various kinds of arithmetic processing. Functional configurations of the controller 11 will be described later with reference to FIG. 3.

The storage 12 includes: a read only memory (ROM) that preliminarily stores various programs and various kinds of data; a random access memory (RAM) that temporarily stores, as a work area, a program and data; a hard disk that stores various programs and various kinds of data; and the like. The storage 12 temporarily saves (stores), for example, a print job for the foil stamping printing.

The communication device 13 includes an interface to communicate with another device such as a personal computer (PC). The communication device 13 receives a print job from, for example, a PC used by an operator.

The operation panel 14 includes: a touch panel; a numeric keypad; a start button; a stop button; and the like. The operation panel 14 displays various kinds of information as a display, and receives various kinds of operation as an operation reception device.

The sheet feeder 15 includes a sheet feeding tray that houses sheets to be used for printing and feeds, one by one, the sheets housed in the sheet feeding tray. Alternatively, the sheet feeder 15 may house and feed a continuous sheet or may feed a continuous sheet from a manual feeding tray, another sheet feeding device, or the like.

The conveyor 16 includes: a conveyance path; a plurality of conveyance rollers arranged along the conveyance path; and a drive motor that drives the conveyance rollers, and conveys, along the conveyance path, a sheet fed by the sheet feeder 15.

The image former 17 uses a known image forming process such as an electrophotographic process to form an image on the sheet conveyed by the conveyor 16.

The fixing device 18 includes a heating roller and a pressure roller, and fixes an image on a sheet by applying heating and pressing to the sheet having the image formed thereon by the image former 17 and conveyed by the conveyor 16.

Note that the image forming system 1 and the image forming apparatus 10 may each include a constituent element other than the constituent elements described above, or may not necessarily include some of the constituent elements described above.

(Controller)

Figure 3:
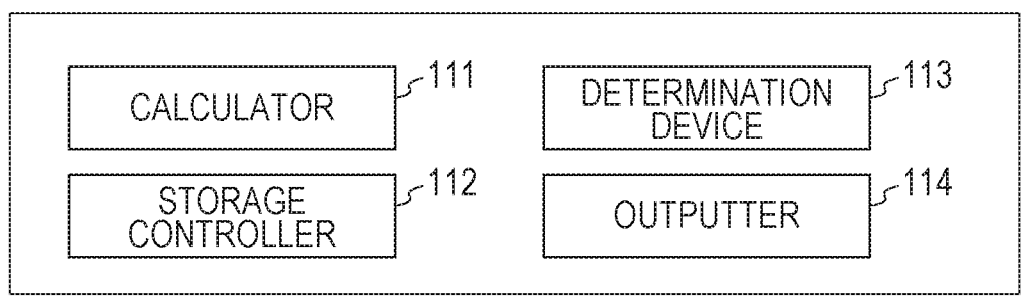
FIG. 3 is a block diagram illustrating functional configurations of a controller of the image forming apparatus.
Figure 4:
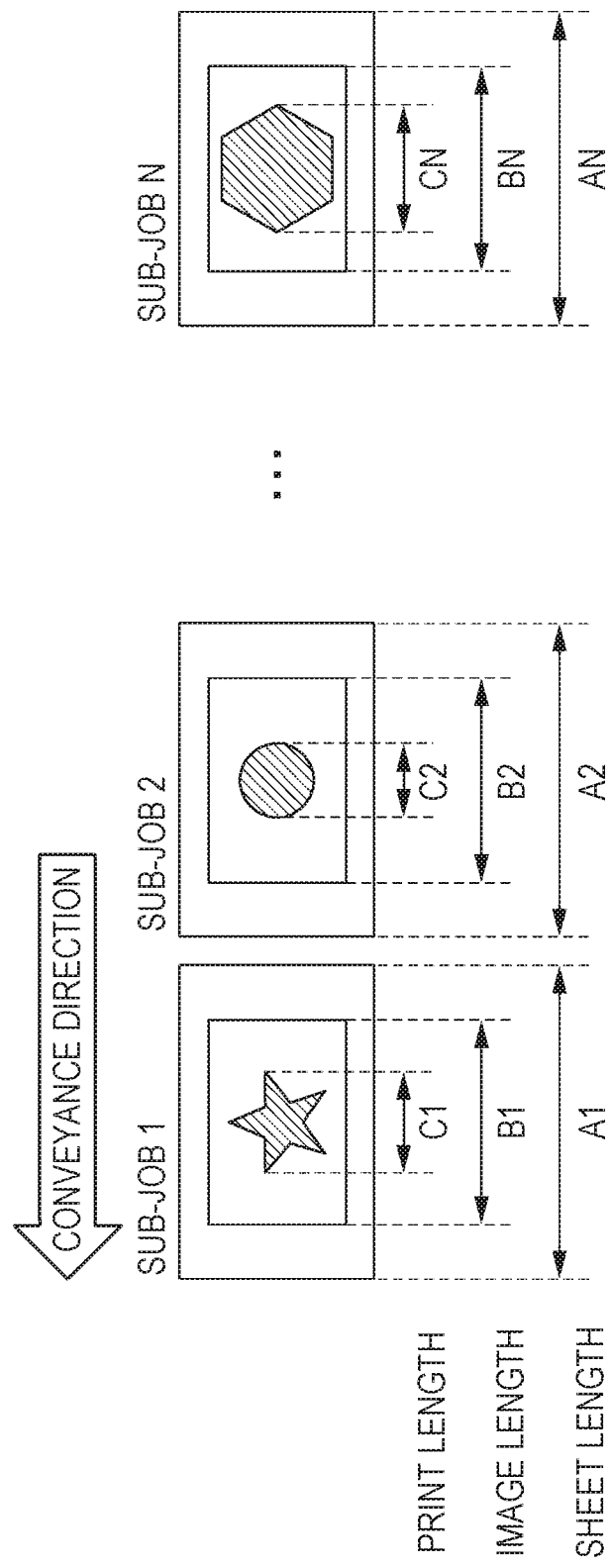
FIG. 4 is a diagram to describe a method of calculating predetermined lengths associated with a print job.

FIG. 3 is a block diagram illustrating the functional configurations of the controller of the image forming apparatus. FIG. 4 is a diagram to describe a method of calculating predetermined lengths associated with a print job.

As illustrated in FIG. 3, the controller 11 functions as a calculator 111, a storage controller 112, a determination device 113, and an outputter 114 by executing processing by reading a program.

The calculator 111 calculates the predetermined lengths in a sheet conveyance direction associated with a print job. For example, the calculator 111 calculates a total length in the conveyance direction of sheet/sheets (hereinafter also referred to as a "total sheet length") conveyed at the time of executing a print job as illustrated in FIG. 4. Additionally, the calculator 111 calculates a total length in the sheet conveyance direction of a maximum region/maximum regions in each of which an image can be formed (hereinafter also referred to as a "total image length") at the time of executing the print job. Each maximum region in which an image can be formed corresponds to, for example, an image size. Furthermore, the calculator 111 calculates a total length in the sheet conveyance direction of an image part/image parts actually formed (print parts) (hereinafter also referred to as a "total print length") at the time of executing the print job. In an example illustrated in FIG. 4, as the predetermined lengths associated with sub-jobs 1, 2 . . . , and N, the total sheet length is calculated by A1+A2+ . . . +AN, the total image length is calculated by B1+B2+ . . . +BN, and the total print length is calculated by C1+C2+ . . . +CN.

The storage controller 112 causes the storage 12 to store calculation results of the predetermined lengths associated with a print job.

The determination device 113 makes various kinds of determination. The determination device 113 determines, for example, whether or not the operation panel 14 has received operation by an operator.

The outputter 114 outputs a calculation result of each predetermined length associated with a print job. The outputter 114 outputs the calculation result of each predetermined length associated with the print job by displaying the calculation result on the operation panel 14, for example.

(Processing)

Subsequently, a processing procedure of the image forming apparatus 10 will be described. The processing of the image forming apparatus 10 controls a use amount of the foil in the foil stamping printing so as to make an operator accurately grasp the use amount.

Figure 5:
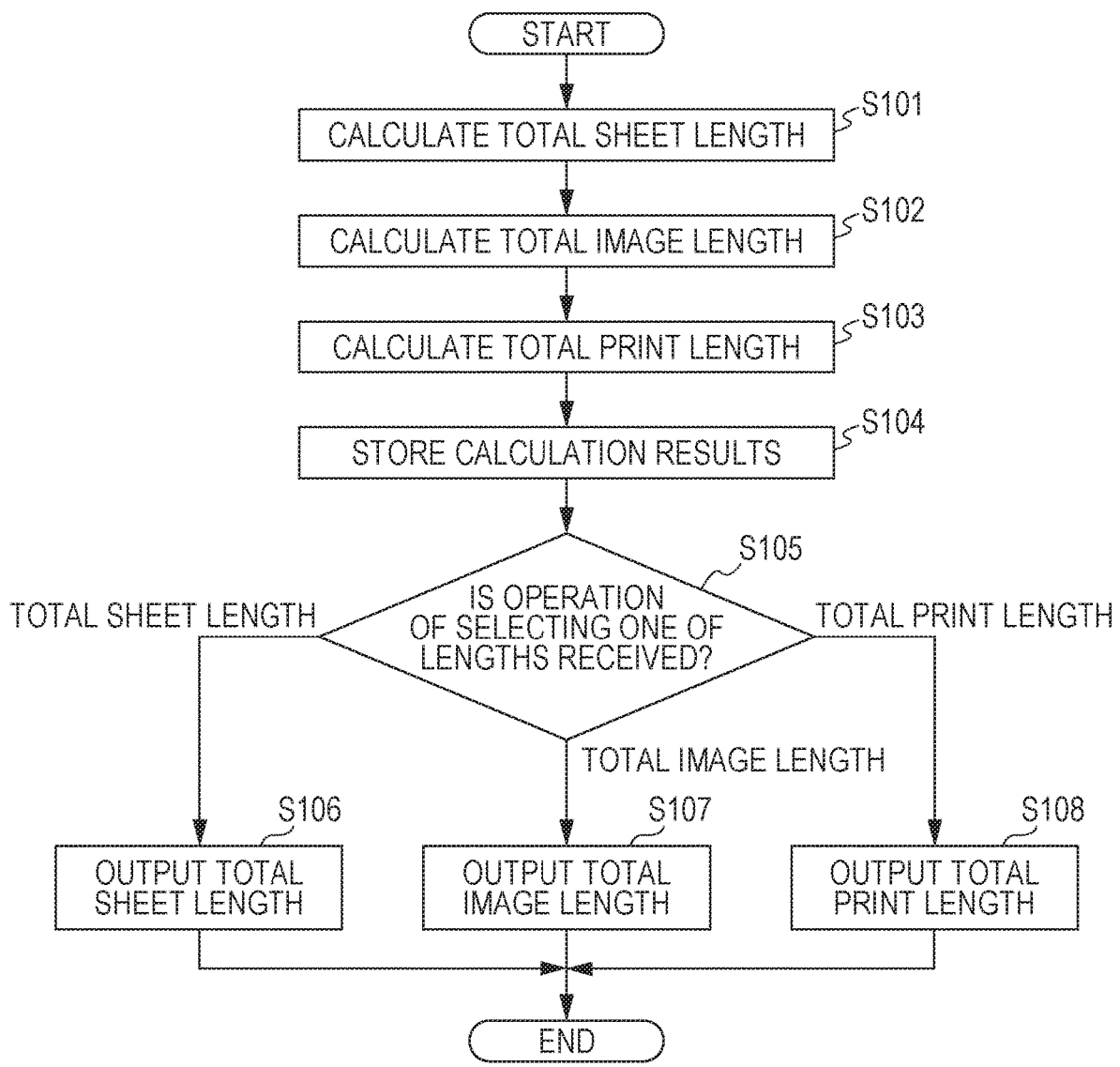
FIG. 5 is a flowchart illustrating an exemplary processing procedure of the image forming apparatus.
Figure 6:
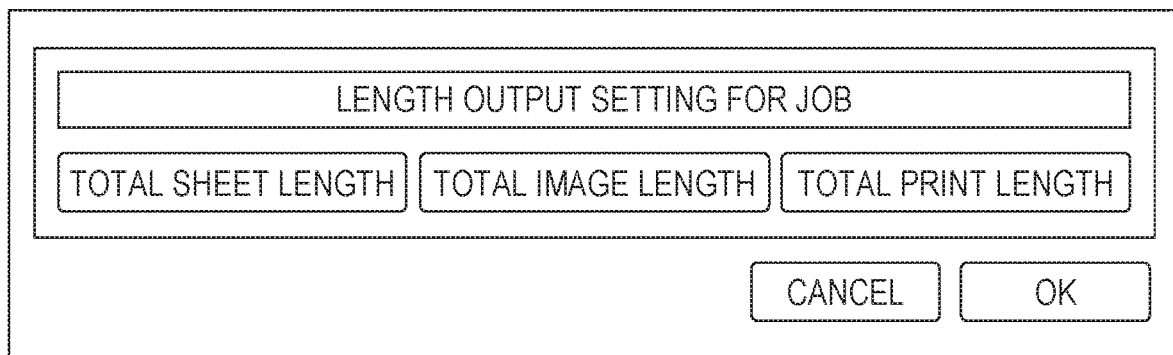
FIG. 6 is a diagram illustrating an exemplary setting screen relating to output of a predetermined length associated with a print job.

FIG. 5 is a flowchart illustrating an exemplary processing procedure of the image forming apparatus. An algorithm illustrated in the flowchart of FIG. 5 is stored as a program in the storage 12 and executed by the controller 11. Additionally, FIG. 6 is a diagram illustrating an exemplary setting screen relating to output of a predetermined length associated with a print job. FIG. 7 is a diagram illustrating an exemplary screen to output a calculation result of a predetermined length associated with a print job.

As illustrated in FIG. 5, when a print job is received, the controller 11 first calculates, as the calculator 111, the predetermined lengths in the sheet conveyance direction associated with the print job. More specifically, the controller 11 calculates the total sheet length in the sheet conveyance direction (step S101). Additionally, the controller 11 calculates the total image length in the sheet conveyance direction (step S102). Furthermore, the controller 11 calculates the total print length in the sheet conveyance direction (step S103). Note that the order of steps S101 to S103 is not limited to the example illustrated in FIG. 5 and may be switched.

Subsequently, the controller 11 causes, as the storage controller 112, the storage 12 to store the calculation results in steps S101 to S103 (step S104). Then, the controller 11 determines, as the determination device 113, whether or not operator's operation of selecting one of the total sheet length, the total image length, and the total print length is received on the setting screen displayed on the operation panel 14, for example, as illustrated in FIG. 6 (step S105).

The total sheet length is selected, for example, in a case of using a foil stamping apparatus 20 that conveys the foil along with conveyance of a sheet (flat sheet). In the case of using such a foil stamping apparatus 20, the use amount of the foil corresponds to the sheet total conveyance amount, that is, the total sheet length. In this case, the operator can confirm the use amount of the foil by confirming the total sheet length.

Additionally, the total image length is selected, for example, in a case of using a foil stamping apparatus 20 that conveys the foil along with conveyance of a continuous sheet (for example, roll paper). In the case of using such a foil stamping apparatus 20, the use amount of foil corresponds to the total conveyance amount of the continuous sheet, that is, the total image length. In this case, the operator can confirm the use amount of the foil by confirming the total image length.

Furthermore, the total print length is selected, for example, in a case of using a foil stamping apparatus 20 that detects an image part/image parts formed on a sheet/sheets and conveys the foil in accordance with the image part/image parts. In the case of using such a foil stamping apparatus 20, the use amount of the foil corresponds to a total length of the image part/image parts, that is, the total print length. In this case, the operator can confirm the use amount of the foil by confirming the total print length.

Subsequently, the controller 11 outputs, as the outputter 114, a calculation result of one of the predetermined lengths associated with the print job on the basis of a determination result in step S105. More specifically, in a case of determining that operation of selecting the total sheet length is received, the controller 11 outputs the calculation result of the total sheet length (step S106). Also, in a case of determining that operation of selecting the total image length is received, the controller 11 outputs the calculation result of the total image length (step S107). Also, in a case of determining that operation of selecting the total print length is received, the controller 11 outputs the calculation result of the total print length (step S108). For example, as illustrated in the lower left of FIG. 7, the controller 11 outputs the calculation result of the predetermined length, as selected by the operator, by displaying, on the operation panel 14, the calculation result of the predetermined length associated with the print job. Note that, in the example illustrated in FIG. 7, the calculation result of the total print length is displayed in meters, but may also be displayed in a different length unit such as inches or feet. Then, the controller 11 ends the processing.

The present embodiment provides the following effects.

The image forming apparatus 10 outputs a calculation result of a total length in the sheet conveyance direction of an image part/image parts formed at the time of executing a print job. As the foil stamping apparatus 20 that transfers the foil to the image, in a case of using a foil stamping apparatus 20 that detects an image part/image parts formed on a sheet/sheets and conveys the foil in accordance with the image part/image parts, the use amount of the foil corresponds to the total length of the image part/image parts. In this case, the image forming apparatus 10 makes an operator accurately grasp the use amount of the foil in the foil stamping printing by making the operator confirm the total length of the image part/image parts.

Additionally, the image forming apparatus 10 further outputs: a calculation result of a sheet total length; or a calculation result of a total length of maximum region/maximum regions in each of which an image can be formed. The image forming apparatus 10 makes the operator accurately grasp the use amount of the foil in the foil stamping printing by making the operator confirm the various lengths in accordance with the types of the foil stamping apparatus 20 associated with a print job.

Furthermore, the image forming apparatus 10 outputs a calculation result of each of the lengths as described above by displaying the calculation result. Consequently, the image forming apparatus 10 can make the operator confirm the calculation result of each of the lengths as described above.

Note that the present invention is not limited to the above-described embodiment, and various modifications and improvements can be made within the scope of the claims.

Modified Example

For example, in the above-described embodiment, the description has been provided by exemplifying the case where the image forming apparatus 10 outputs a calculation result of a predetermined length associated with a print job by displaying the calculation result. However, the image forming apparatus 10 may output the calculation result of the predetermined length associated with the print job by printing the calculation result instead of or in addition to displaying the calculation result. More specifically, the controller 11 of the image forming apparatus 10 may output, as the outputter 114, the calculation result of the predetermined length associated with the print job by making the image former 17 print the calculation result.

For example, the controller 11 may control the image former 17 so as to print the calculation result of the predetermined length associated with the print job on a back surface of a sheet conveyed first or a sheet conveyed last at the time of executing the print job. Note that the calculation result of the predetermined length associated with the print job is preferably printed at a position such as an edge part of the sheet or a waste part of the sheet, and such a print position may be adjustable by an operator.

Alternatively, the controller 11 may control the image former 17 so as to print the calculation result of the predetermined length associated with the print job on, for example, an interleaving sheet inserted immediately before the sheet conveyed first or immediately after the sheet conveyed last at the time of executing the print job.

The modified example provides the following effects.

The image forming apparatus 10 outputs a calculation result of a predetermined length associated with a print job by printing the calculation result. Consequently, even when an operator of the foil stamping printing cannot confirm the calculation result of the predetermined length displayed on the image forming apparatus 10, the image forming apparatus 10 can make the operator confirm the printed calculation result of the predetermined length.

Also, the image forming apparatus 10 prints the calculation result of the predetermined length associated with the print job on the back surface of the sheet that is conveyed first or the sheet conveyed last at the time of executing the print job. Consequently, even in a case where the image forming apparatus 10 executes a print job including printing of a plurality of pages, the operator can easily confirm a printed calculation result of a predetermined length by flipping the first sheet or the last sheet of the plurality of output sheets. Furthermore, the image forming apparatus 10 does not have to transfer the foil to the printed calculation result of the predetermined length and can suppress wasteful consumption of the foil.

Alternatively, the image forming apparatus 10 prints the calculation result of the predetermined length associated with the print job on the interleaving sheet inserted immediately before the sheet conveyed first or immediately after the sheet conveyed last at the time of executing the print job. Consequently, even in a case where the calculation result of the predetermined length cannot be directly printed on a sheet/sheets where an image/images based on the print job is/are formed, the image forming apparatus 10 can make the operator confirm the calculation result because the calculation result can be printed on the interleaving sheet.

Additionally, in the above-described embodiment, the description has been provided by exemplifying the case where the image forming apparatus 10 calculates the total sheet length, the total image length, and the total print length as the predetermined lengths associated with a print job. However, the image forming apparatus 10 may not necessarily calculate at least one of the total sheet length, the total image length, and the total print length. For example, the image forming apparatus 10 may receive operator's operation of selecting one of the total sheet length, the total image length, and the total print length before calculating the predetermined lengths associated with the print job, and the image forming apparatus 10 may calculate only the length selected by the operator.

Furthermore, in the above-described embodiment, the description has been provided by exemplifying the case where the image forming apparatus 10 outputs a calculation result of one of the total sheet length, the total image length, and the total print length selected by the operator. However, the image forming apparatus 10 may simultaneously output the calculation results of the plurality of lengths from the beginning.

Additionally, in the above-described embodiment, the description has been provided by exemplifying the case where the image forming apparatus 10 uses toner to form an image to which the foil is to be transferred. However, the image forming apparatus 10 may be an inkjet printer and may use varnish instead of ink to form an image to which the foil is to be transferred.

Furthermore, the processing according to the above-described embodiment may include steps other than the above-described steps or may not necessarily include some of the above-described steps. Additionally, the order of the steps is not limited to the above-described embodiment. Moreover, each step may be combined with another step and executed as one step, may be included and executed in another step, may be divided into a plurality of steps and executed, and may be executed at the same time with another step.

Additionally, a means and a method that perform various kinds of processing in the image forming apparatus 10 according to the above-described embodiment can be implemented by any of a dedicated hardware circuit and a programmed computer. The above-described program may be provided by, for example, a computer readable recording medium such as a compact disc read only memory (CD-ROM), or may be provided online via a network such as the Internet. In this case, the program recorded in the computer readable recording medium is normally transmitted and stored in a storage such as a hard disk. Also, the above-mentioned program may be provided as independent application software, or may be incorporated in software as a function of the image forming apparatus 10.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus that forms an image onto foil transferred, the image forming apparatus comprising a hardware processor that:
   calculates a plurality of total lengths comprising:
      a total length, in a sheet conveyance direction, of an image part/image parts formed at a time of executing a print job,
      a total length, in the sheet conveyance direction, of a sheet/sheets conveyed at the time of executing the print job, and
      a total length, in the sheet conveyance direction, of a print part/print parts at the time of executing the print job,
   receives operation from a user that selects a total length from among the plurality of total lengths,
   outputs the selected total length, and
   determines use amount of foil based on the selected total length.

2. The image forming apparatus according to claim 1, wherein: the total length of the image part/image parts is a total length, in the sheet conveyance direction, of a maximum region/maximum regions in each of which an image is formed at the time of executing the print job.

3. The image forming apparatus according to claim 1, further comprising a display,
   wherein the hardware processor outputs the selected total length by displaying the selected total length on the display.

4. The image forming apparatus according to claim 1, further comprising an image former,
   wherein the hardware processor outputs the selected total length by making the image former print the selected total length.

5. The image forming apparatus according to claim 4, wherein the hardware processor controls the image former so as to print the selected total length on a back surface of a sheet conveyed first or a sheet conveyed last at the time of executing the print job.

6. The image forming apparatus according to claim 4, wherein the hardware processor controls the image former so as to print the selected total length on an interleaving sheet inserted immediately before a sheet conveyed first or inserted immediately after a sheet conveyed last at the time of executing the print job.

7. A non-transitory recording medium storing a computer readable control program of an image forming apparatus that forms an image onto foil transferred, the computer readable control program causing a computer to perform operations comprising:
   calculating a plurality of total lengths comprising:
      a total length, in a sheet conveyance direction, of an image part/image parts formed at a time of executing a print job,
      a total length, in the sheet conveyance direction, of a sheet/sheets conveyed at the time of executing the print job, and
      a total length, in the sheet conveyance direction, of a print part/print parts at the time of executing the print job,
   receiving operation from a user that selects a total length from among the plurality of total lengths,
   outputting the selected total length, and
   determining use amount of foil based on the selected total length.

8. The non-transitory recording medium according to claim 7, wherein: the total length of the image part/image parts is a total length, in the sheet conveyance direction, of a maximum region/maximum regions in each of which an image formed at the time of executing the print job.

9. The non-transitory recording medium according to claim 7, wherein the outputting includes displaying the selected total length on a display included in the image forming apparatus.

10. The non-transitory recording medium according to claim 7, wherein the outputting includes printing the selected total length by using an image former included in the image forming apparatus.

11. The non-transitory recording medium according to claim 10, wherein the outputting includes controlling the image former so as to print the selected total length on a back surface of a sheet conveyed first or a sheet conveyed last at the time of executing the print job.

12. The non-transitory recording medium according to claim 10, wherein the outputting includes controlling the image former so as to print the selected total length on an interleaving sheet inserted immediately before a sheet conveyed first or inserted immediately after a sheet conveyed last at the time of executing the print job.

\* \* \* \* \*